(12) United States Patent
Cazier et al.

(10) Patent No.: US 7,697,054 B2
(45) Date of Patent: Apr. 13, 2010

(54) IMAGE MANIPULATOR FOR A CAMERA

(75) Inventors: Robb P. Cazier, Fort Collins, CO (US); Murray Dean Craig, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 371 days.

(21) Appl. No.: 11/693,171

(22) Filed: Mar. 29, 2007

(65) Prior Publication Data

US 2008/0239133 A1 Oct. 2, 2008

(51) Int. Cl.
*H04N 5/222* (2006.01)
*G09G 5/00* (2006.01)

(52) U.S. Cl. .............................. 348/333.05; 348/333.12; 345/619

(58) Field of Classification Search ............ 348/333.05, 348/333.12; 382/276–308; 345/619–689, 345/156–184; 715/700–866
See application file for complete search history.

(56) References Cited

U.S. PATENT DOCUMENTS

| 6,509,915 | B2 | 1/2003 | Berman et al. |
| 6,538,663 | B2 * | 3/2003 | Kamei ...................... 345/635 |
| 6,809,771 | B1 * | 10/2004 | Hamaguchi et al. ......... 348/335 |
| 7,024,053 | B2 * | 4/2006 | Enomoto ..................... 382/284 |
| 7,224,393 | B2 * | 5/2007 | Ojima et al. ........... 348/333.03 |
| 7,440,013 | B2 * | 10/2008 | Funakura .................... 348/239 |
| 2001/0004268 | A1 | 6/2001 | Kubo et al. |
| 2004/0012702 | A1 * | 1/2004 | Ishige .................... 348/333.12 |
| 2004/0021790 | A1 * | 2/2004 | Iga ......................... 348/333.12 |
| 2005/0041132 | A1 * | 2/2005 | Juen et al. ............... 348/333.12 |
| 2005/0097475 | A1 * | 5/2005 | Makioka et al. ............. 715/792 |
| 2005/0140813 | A1 * | 6/2005 | Wani ..................... 348/333.12 |
| 2006/0098112 | A1 * | 5/2006 | Kelly ..................... 348/333.12 |
| 2006/0170807 | A1 * | 8/2006 | Abe et al. ............. 348/333.05 |
| 2008/0055453 | A1 * | 3/2008 | Battles et al. .......... 348/333.05 |

FOREIGN PATENT DOCUMENTS

| JP | 62262821 A | 11/1987 |
| JP | 2000348114 A | 12/2000 |
| KR | 10-1997-0031953 | 6/1997 |

OTHER PUBLICATIONS

"HP Design Gallery Technology Tour," www.hp.com/united-states/consumer/digital_photography/tour, printed Dec. 20, 2006, © Copyright 2006 Hewlett-Packard Development Company, L.P. (2 pages).
"HP Digital Photography," www.hp.ca/portal/hho/dpc/take_photos/choosing_hp_dig_cam.php, printed on Dec. 20, 2006, (2 pages).
"HP Design Gallery," © Copyright 2006 Hewlett-Packard Development Company, L.P. (3 pages).

* cited by examiner

*Primary Examiner*—Justin P Misleh
*Assistant Examiner*—Pritham Prabhakher

(57) ABSTRACT

A method and system for editing an image with a camera includes simultaneously displaying a first image and a second image separate from each other on a display screen of the camera and modifying the first image, via a user interface of the camera, using a portion of the second image.

25 Claims, 4 Drawing Sheets

IMAGE MANIPULATOR FOR A CAMERA

BACKGROUND

Digital photography has revolutionized the way many consumers handle their photographs. Once the province of professional photography, photo editing has become commonplace on home computers through the use of editing software and the ease of transferring digital photos onto the home computer. Consumers can readily remove red eye, as well as enlarge or crop digital photos. However, some consumers remain unpersuaded of the benefits of digital photography and continue to prefer film photography.

For those hooked by the allure of digital photography, the digital camera also has altered the way people take pictures, as one can instantly view a digital image on a display of the digital camera. Some conventional digital cameras even let the user enhance the image directly from the display of the digital camera. In these conventional digital cameras, a software-driven menu is viewable on the display of the camera, along with an input device, to facilitate enhancing the digital image at the display of the camera. For example, a user is able is change a border of the image or apply colorization effects to the image. However, these conventional digital cameras are fairly limited in their ability to enhance the image via the display of the camera. Accordingly, this limitation, among other limitations, frustrates consumers that are anxious to maximize their new found freedom in digital photography.

Given the demand for digital photography and a desire to convert those still adhering to conventional film photography, camera manufacturers continually strive to improve their customers control over their digital photographs.

DETAILED DESCRIPTION

Figure 1:
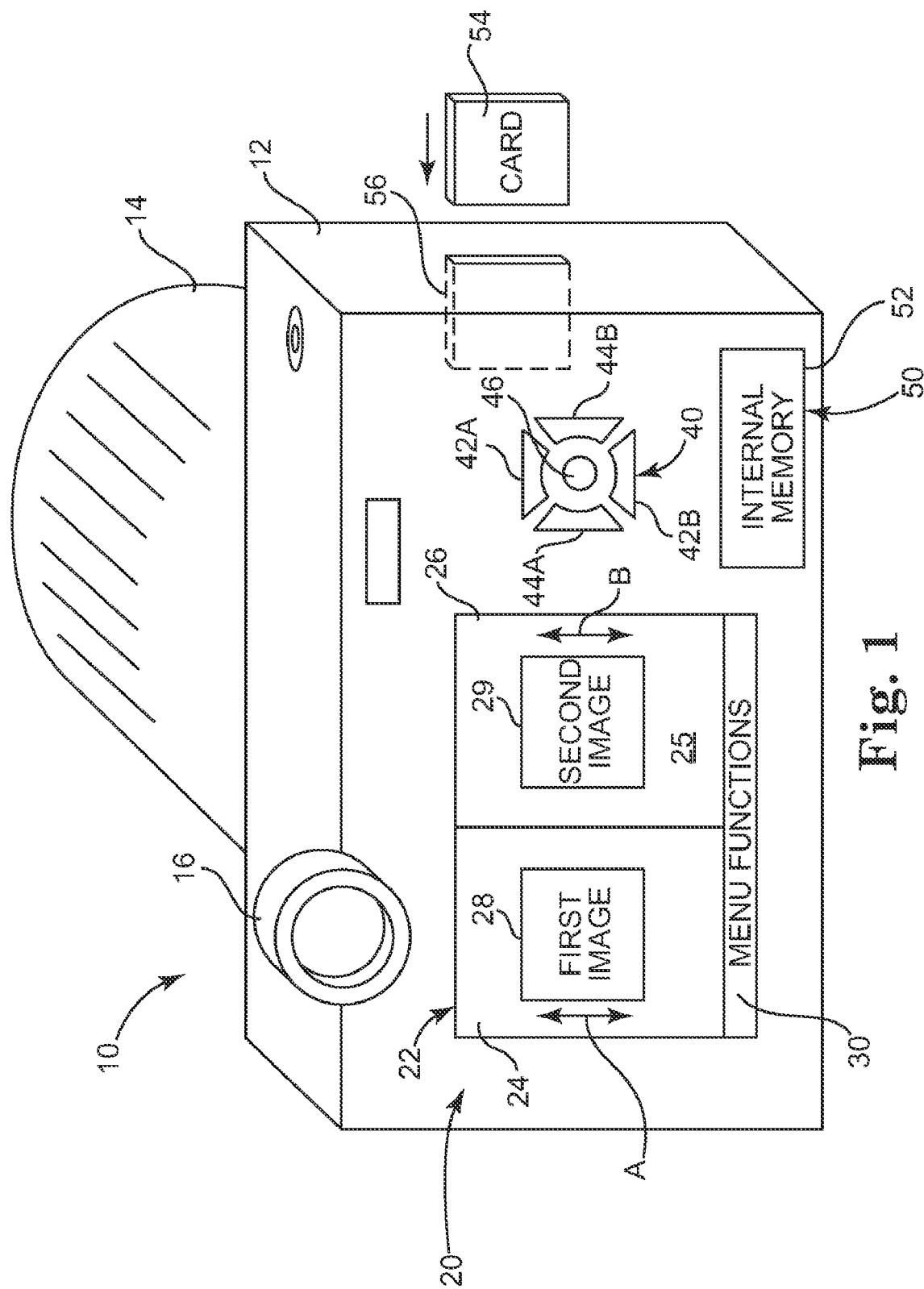
FIG. 1 is a perspective view of a camera, according to an embodiment of the invention.

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the invention are directed to a system and a method for editing an image directly at a display screen of a camera. In one embodiment, the display screen includes two independent screen portions adjacent to each other so that two different images are viewable on the display screen in a side-by-side relationship or a top-to-bottom relationship. In other words, a first photographic image is viewable in a first screen portion while a different second photographic image is viewable in a second screen portion adjacent to the first screen portion. In one aspect, the first image is selected for viewing by scrolling through a plurality of images accessible from the memory of the camera while the second image is also selected by scrolling through the same plurality of images (or a different plurality of images). However, the scrolling of the images in the first screen portion is controlled separately from the scrolling of the images in the second screen portion. In addition, in another embodiment, the second image is a generally continuous live image captured via a lens of the camera.

In one embodiment, a target portion of the first image on the first screen portion is identified for manipulation. A swapping function accessible at the user interface of the camera is initiated to substitute a corresponding portion of the second image on the second screen portion for the target portion of the first image on the first screen portion. The camera includes a selection mechanism, such as a touch screen or cursor, for identifying the target portion of the first image and/or the corresponding portion of the second image. Other embodiments of the selection mechanism are described later.

Once the substitution has been made from the second image to the first image, an operator has the discretion to invoke a pan function to enable the operator to move the substituted portion of the first image in an up, down, left, or right direction within the first image to position the substituted portion in the desired location within the first image. In another aspect, the user interface includes a zoom function to enable the operator to resize (enlarge or reduce) the substituted portion within the first image relative to the other portions of the first image.

In one embodiment, the first image and the second image are both accessed from a memory of the camera, such as an internal memory or a removably insertable memory card. In another embodiment, the first image is accessed from the memory of the camera while the second image is a live image obtained via a lens of the camera. In one aspect, this live image comprises a substantially live image viewable on the second screen portion via a buffer mechanism of the memory that repeatedly refreshes the second screen portion with images being captured in real time by the lens of the camera. Upon identifying an attractive live image, the user locks onto the live image viewed in the second screen portion and then initiates one or more editing functions, such as a swapping function or other manipulations, on the second "live" image and the first image.

Embodiments of the invention, such as a dual screen scrolling capability and/or live image editing, expands the frontier in digital photography by enabling significant manipulation of images directly at the user interface of the camera. In particular, this direct manipulation capability creates an immediate feedback loop to enable the photographer to discern, while the photographer is still in the field, whether the images they have obtained are adequate to perform the image manipulation (e.g., swapping) or whether additional images should be captured to achieve the desired image manipulation. In some instances, this direct manipulation capability, made possible via the dual scrolling mechanism, enables the photographer to completely dispense with later editing at a computer. In one aspect, this direct manipulation capability is further enhanced in the above-described live image capture mode, in which the operator views a first static image in the first screen portion and views a live image in the second screen portion to make a real time comparison relative to the first static image.

In contrast, a photographer using a conventional camera would have to wait until they transferred the images to a computer and then perform the desired manipulations or editing operations. Only at that time would the photographer know whether or not the images are adequate for the intended manipulation of the images. Moreover, even if the operator attempted to compare different images at the camera, the conventional single screen display of the camera would prevent simultaneous comparison of two different images for editing purposes.

These embodiments, and additional embodiments, are described in detail in association with FIGS. 1-6.

FIG. 1 is a perspective view of camera 10, according to one embodiment of the invention. As illustrated in FIG. 1, camera 10 includes body 12, lens 14, and viewfinder 16 with body 12 including a user interface 20. In one aspect, camera 10 comprises memory 50 as an internal memory 52 and/or a removably insertable memory card 54, which is receivable into slot 56 of camera body 12.

In one aspect, user interface 20 comprises a display screen 22 including first window 24 (i.e., first screen portion) displaying first image 28 and second window 26 (i.e., second screen portion) displaying second image 29. In one embodiment, user interface 20 comprises a graphical user interface also viewable on display screen 22 of camera 10 (FIG. 1). First image 28 and second image 29 are accessed via user interface 20 from memory 50 of camera 10. In one embodiment, as illustrated in FIG. 1, first window 24 of screen 22 is in a side-by-side relationship with second window 26 of screen 22. In another embodiment, first window 24 of screen 22 is arranged in a top-to-bottom relationship relative to second window 26 of screen 22 so that first window 24 is disposed vertically above second window 26.

In one aspect, as illustrated in FIG. 1, images 28, 29 fill only a portion of their respective first and second windows 24, 26 to also enable viewing and/or operation of menu functions 30 via display screen 22. Menu functions 30 are described later in association with editing monitor 200 of FIG. 3. In another aspect, images 28, 29 are sized to substantially fill the respective first and second windows 24, 26 of display screen 22 and menu functions 30 are viewable within first window 24 and/or second window 26 at the discretion of the operator upon selective activation.

In another embodiment, the images 28, 29 and menu functions 30 viewable in display screen 22 are also displayed on a smaller scale within viewfinder 16, consistent with the manner in which conventional cameras synchronize the display of a viewfinder and a display on the body of the camera.

In one embodiment, display screen 22 comprises a single liquid crystal display (LCD) that is partitioned via a software algorithm into first window 24 and second window 26. In another embodiment, display screen 22 comprises two separate display screens arranged adjacent to each other so that first window 24 comprises a display screen that is physically independent of a display screen defining second window 26.

In one embodiment, as illustrated in FIG. 1, display screen 22 comprises a touch screen 25 to permit the user to: (1) activate a function from menu functions 30 viewable on display screen 22; (2) select a target portion or substitute portion of an image for manipulation; and (3) control scrolling within first window 24 or second window 26. The user performs functions directly on the touch screen 25 via a stylus or their finger. In another embodiment, display screen 22 does not comprise a touch screen 25.

Accordingly, in one aspect, user interface 20 comprises input device 40 configured for controlling, among other things, images 28, 29 viewed on display screen 22 as well as navigation and activation of menu functions 30. In one embodiment, input device 40 includes buttons 42A, 42B, 42C, 42D arranged in a 4-way rocker configuration to surround central push button 46 with each button 42A-46 assigned to control a particular function of camera 10.

In one embodiment, display screen 22 is operable in a dual scroller mode in which a plurality of first images 28 are viewable in first window 24 of display screen 22 and a plurality of second images 29 are viewable in second window 26 of display screen 22. In this dual scroller mode, an operator uses input device 40 and/or touch screen 25 to regulate scrolling of the first images 28 within first window 24 (as represented by directional arrow A) and regulates, independent of first window 24, scrolling of the second images 29 within second window 26 (as represented by directional arrow B).

In one embodiment, buttons 42A, 42B of input device 40 are assigned to control scrolling of first images 28 within first window 24 and buttons 44A, 44B are assigned to control scrolling of second images 29 within second window 26, or vice versa. In another embodiment, only one set of buttons (buttons 42A and 42B) or (buttons 44A and 44B) control scrolling for both first and second windows 24, 26 with one of the other buttons of input device 40 or touch screen 25 activating which window is in active scrolling mode. In addition, in another aspect, menu functions 30 available via touch screen 25 (as supported by editing monitor 300 of FIG. 3) include a scrolling control input to control scrolling within first window 24 and second window 26.

In another embodiment, one or more buttons 42A-44B of input device 40 is relocated to be positioned adjacent to each of the respective first or second windows 24, 26 for controlling scrolling with those respective windows.

Accordingly, via the scrolling functions described above, user interface 20 of camera 10 enables an operator to select of a pair of images for manipulation on display screen 22.

Figure 2A:
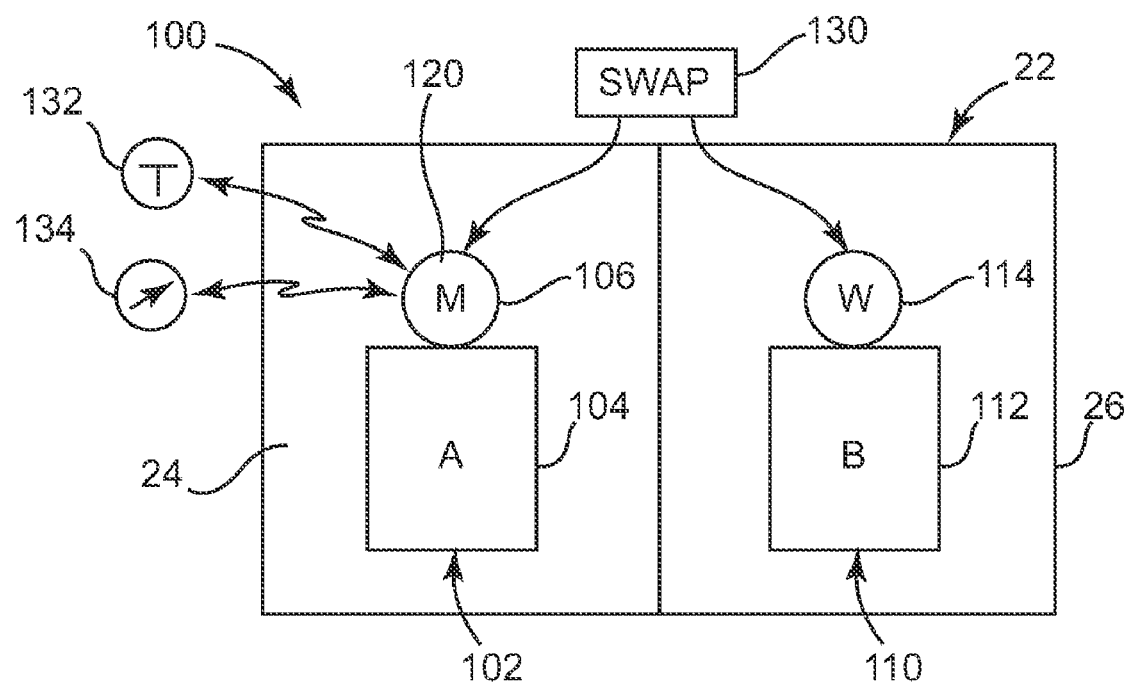
FIG. 2A is a schematic illustration of a method of editing an image on a display of a camera, according to an embodiment of the invention.

FIG. 2A is a schematic view of display screen 22 of camera 10 (FIG. 1) illustrating a method 100 of manipulating an image viewable on a display of a camera, according to one embodiment of the invention. As illustrated in FIG. 2A, a first image 102 is viewable on first window 24 of display screen 22 of camera 10 and a second image 110 is viewable on second window 26 of display screen 22. First image 102 comprises a first portion 104 and a second portion 106, while second image 110 comprises a first portion 112 and a second portion 114. In one embodiment, first image 102 comprises a person with first portion 104 comprising a body and second portion 106 comprising a head of the person while second image 110 comprises a person with first portion 112 comprising a body and second portion 114 comprising a head of the person. In another embodiment, first image 102 and/or second image 110 comprise any one of an unlimited range of living things, objects, etc. instead of a person.

Figure 3:
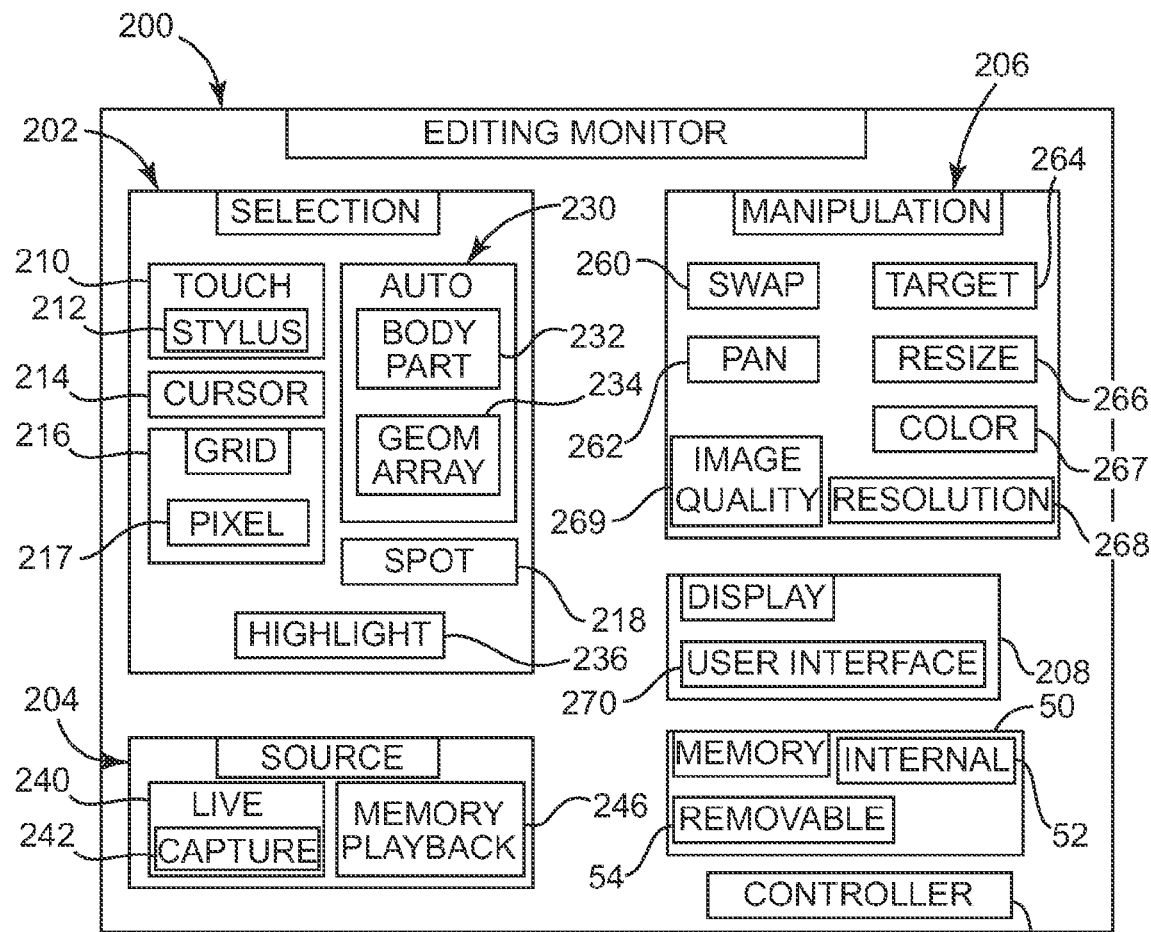
FIG. 3 is a block diagram of an editing monitor, according to an embodiment of the invention.

In one embodiment, a target portion 120, such as second portion 106 of first image 102, is selected for manipulation via a cursor tool 134 and/or a touch screen mechanism 132 in association with user interface 20, as described in more detail in association with FIG. 3. After selection of target portion 120, first image 102 is manipulated via a swapping function 130 of user interface 20 in which second portion 114 of second image 110 is substituted in place of second portion 106 (the target portion 120) of first image 102. As described later in association with FIGS. 3-5B, the swapping function 130 operates in association with auto recognition function 230 and other functions of editing monitor 200 to match the target portion 120 with the substitute portion (e.g. second portion 112). In another embodiment, after selection of target portion 120, a different function for manipulating target portion 120 is applied to first image 102 using a portion of second image 110.

In another embodiment, the substitute portion, such as second portion 114 of second image 110 is identified via the touch screen mechanism 132 or cursor tool 134 and then the swapping function is applied in a "pull" mode to replace target portion 120 (second portion 106 of first image 102) using the identified substitute portion.

Figure 2B:
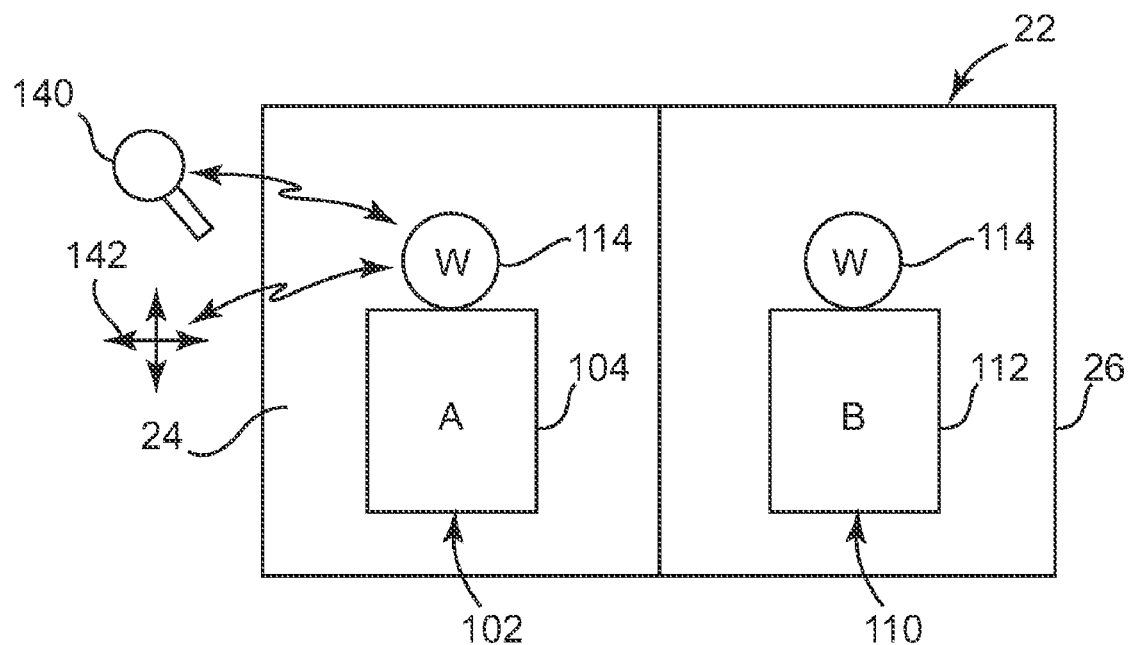
FIG. 2B is a schematic illustration of a method of editing an image on a display of a camera, according to an embodiment of the invention.

FIG. 2B is a schematic view illustrating display screen 22 of camera 10 (FIG. 1) after second portion 114 of second image 110 has been substituted for second portion 106 of first image 102. As illustrated in FIG. 2B, after execution of the swap function 130, display screen 22 displays first image 102 including the first portion 104 and a new second portion 114 obtained from second image 110. In one embodiment, as illustrated in FIG. 2B, the substituted second portion 114 of first image 102 is modified via a magnifying tool 140 to either enlarge or shrink second portion 114 relative to first portion 104 of first image 102. In another embodiment, a pan tool 142 is used at the discretion of the operator to reposition the substituted second portion 114 of first image 102 in an up, down, left or right direction relative to first portion 104 of first image 102. In one aspect, the pan tool 142 and/or the magnifying tool 140 is controlled via user interface 20 of camera (FIG. 1).

In another embodiment, another mode of swapping function 130 is employed in which second portion 106 of first image 102 is switched with second portion 114 of second image 110 so that a modified first image 102 includes second portion 114 and first portion 104 and a modified second image 110 includes second portion 106 and first portion 112.

Moreover, swapping function 130 is not limited to manipulation of second portions 106, 114 of first and second images 102, 110, respectively, but is applicable to any portion of first and second images 102, 110. In addition, application of swapping function 130 is not limited to the geometries shown in FIGS. 1-2B (e.g., circular and rectangular shapes) but extends to a full range of geometrical shapes, some of which are further described in association with FIGS. 3-5B.

In one embodiment, as described above, the first image 102 and second image 110 comprise different images while in another embodiment, first image 102 and second image 110 comprise the same image or substantially the same image.

FIG. 3 is a block diagram illustrating an editing monitor 200 of camera 10, according to one embodiment of the invention.

As illustrated in FIG. 3, editing monitor 200 comprises selection module 202, source module 204, manipulation module 206, memory 50, controller 280, and display module 208 with user interface 270.

In one embodiment, user interface 270 of editing monitor 200 is configured to enable selection and control of the various components, parameters, functions and modules of editing monitor 200 to facilitate manipulating images on display screen 22. Moreover, the various components, parameters, functions, and modules of editing monitor 200 illustrated in FIG. 3 represent actual functions supported by software, firmware, hardware, etc. as well as displayable and selectable features of user interface 270. For example, in one embodiment, user interface 270 of editing monitor 200 forms a portion of and/or operates in association with user interface 20 of camera 10 illustrated in FIG. 1. Finally, in one embodiment, the components, parameters, functions, and modules of editing monitor 200 are not strictly limited to the arrangement shown in FIG. 3 and are arrangeable into different combinations to achieve the same functions described herein.

Selection module 202 of editing monitor 200 facilitates selection of target portions and substitution portions of images (on display screen 22 of camera 10) to be manipulated. In one embodiment, as illustrated in FIG. 3, selection module 202 comprises touch function 210 with stylus function 212, cursor function 214, grid function 216, spot function 218, and highlight function 236. Selection module 202 also comprises auto recognition function 230 including body part function 232 and geometric array function 234.

Touch function 210 of editing monitor 200 provides touch screen functionality for display screen 22 with stylus function 212 permitting a user to apply a stylus on display screen 22 to manipulate images on display screen by activating the various functions, parameters, and modules of editing monitor 200. Cursor function 214 provides control over images on display 222 via a cursor-type navigation element controllable via input device 40 (FIG. 1), as further described in association with FIG. 4C.

Figure 4A:
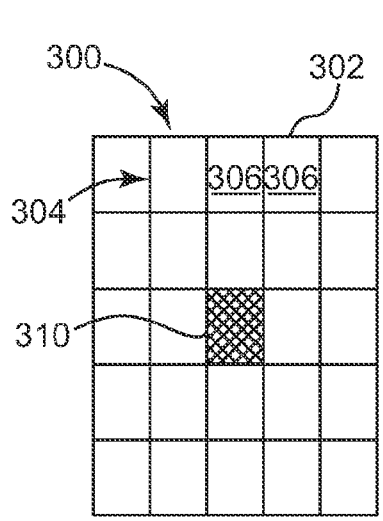
FIG. 4A is a schematic illustration of a grid selector in a method of editing an image, according to an embodiment of the invention.

In one embodiment, grid function 216 of selection module 202 facilitates identifying a target portion of an image on display screen 22 by selecting a portion of a grid on display screen 22 that corresponds to the target portion of the image, as further described in association with FIG. 4A. In another embodiment, grid function 216 additionally comprises a pixel parameter 217 to activate a pixel mode of grid function 216 in which each grid location corresponds to a pixel of the image or to a pixel of the screen display, respectively, as further described in association with FIG. 4A.

Figure 4B:
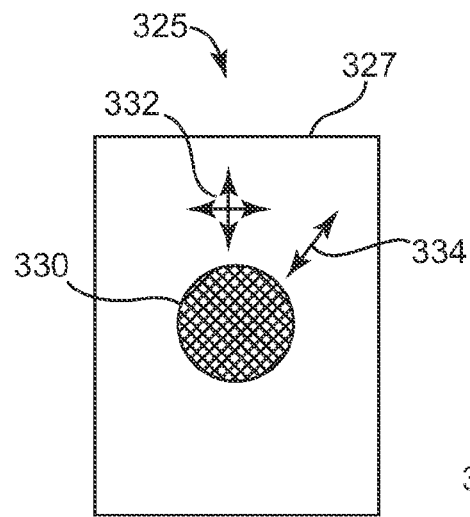
FIG. 4B is a schematic illustration of a spot selector in a method of editing an image, according to an embodiment of the invention.

In another embodiment, spot function 218 facilitates identifying a target portion of an image on display screen 22 by positioning a resizable spot on display screen 22 to correspond to the target portion of the image, as further described in association with FIG. 4B.

Auto recognition function 230 of selection module 202 of editing monitor 200 provides automatic recognition of specific shapes or items within an image to facilitate selection of that specific shape or item for manipulation. In one embodiment, auto recognition function 230 operates in association with body part parameter 232 to automatically recognize a body part of a person or animal (e.g., a head, foot, arm, leg, torso, hand, etc.) within an image to be manipulated, as further illustrated and described in association with FIG. 5B. In another embodiment, auto recognition function 230 operates in association with geometric array parameter 234 to recognize a geometric shape (from among an array of geometric shapes) within an image to be manipulated, as further described in association with FIG. 5A.

In one embodiment, selection module 202 comprises a highlight function 236 which provides control over the manner in which the target portion of the first image 102 and/or the substitute portion of the second image 110 is recognized on the display screen 22. In one aspect, highlight function 236 causes the target portion or the substitute portion to be visually identifiable via a colored overlay (e.g., green, gray, etc.) and/or a shape overlay (e.g., dashed circular or other shaped outline around the selected portion) to make it easy for the operator to recognize the selected portion (e.g., target portion or substitute portion).

As illustrated in FIG. 3, in one embodiment, source module 204 of editing monitor 200 comprises live function 240 and memory playback function 246 with live function including capture function 242. Source module 204 enables the operator to determine the type of images to be used for manipulation. In particular, live function 240 enables the operator to compare a live image (obtained via lens 14 of camera 10 in FIG. 1) with a static image from memory 50 of camera 10 with the live image and the static image being arranged on the first and second windows 24, 26 of display screen 22. Once the desired live image is created via the skill of the operator with camera 10, capture function 242 is implemented to freeze or lock onto that live image for use in swapping a portion of the locked live image for a portion of the static image.

Memory playback function 246 facilitates the operator's use of memory 50 to sort through and identify a static image for use in image comparison and manipulation on display screen 22 of camera 10. In one embodiment, editing monitor 200 acts in association with memory 50 (as previously described in association with FIG. 1) and/or is stored within memory 50.

As illustrated in FIG. 3, in one embodiment, manipulation module 206 of editing monitor 200 comprises swap function 260, pan function 262, target function 264, resize function 266, color function 267, resolution function 268 and image quality function 269. In one embodiment, after identification of a first image and second image via the selection module 202 of editing monitor 200, swap function 260 comprises a mechanism controllable by the operator to substitute a portion of second image for a selected target portion of the first image without the second image being modified, as previously described in detail in association with FIGS. 2A-2B. In another embodiment, by activating the swap function 260, the target portion of the first image and the substitute portion of the second image are completely switched for each other.

In one embodiment, the substitution portion of the second image replaces a target portion of the first image having a substantially similar shape and size (e.g. a human head) as the substitution portion. In other embodiments, the substitution portion (e.g., a tree branch) of the second image replaces a target portion (e.g., a dog) of the first image that is substantially different in type, size and/or shape than the substitution portion.

Pan function 262 provides control over a position of a target portion or a substitution portion of an image within first window 24 or second window 26 of display screen by permitting the operator to move the portion (target or substitution) in an up, down, left, or right direction relative to remaining portions of the image being manipulated. In one embodiment, target function 264 enables the operator to initiate and manually control, via the tools of selection module 202, selection of the target portion of the image to be manipulated. In one embodiment, resize function 266 provides control over a size of a target portion or a substitution portion of an image within first window 24 or second window 26 of display screen by permitting the operator to either enlarge or shrink the portion (target or substitution) relative to remaining portions of the image being manipulated.

In one aspect, color function 267 of manipulation module 206 provides control over the color of an entire first image 102 or second image 110, as well as portions of those images. The color function 267 controls whether the first image 102 or the second image 110 is a black-and-white image or a color image, as well as controlling the intensity of colorization and/or tinting of color in the image.

In one embodiment, color function 267 is employed in association with a swapping function 260 prior to manipulation of the images. In one non-limiting example, via user interface 20 the operator is able to manipulate a first image and a second image, where the second image is a copy of the first image except with the second image being black and white and the first image being color. In this example, a black and white portion (e.g., a person's head) from the second image is substituted in place of a corresponding color portion (e.g., a person's head) of the first image, or vice versa. When the first image and the second image are substantially the same, except for their colorization, the manipulated image will not need to be adjusted (e.g., via zooming, panning, adjusting resolution, etc.) because the first image and the second image already have the same general characteristics. Moreover, in another non-limiting example, portions of a first color image and a second black-and-white image (or vice versa) are swapped even when the first image and the second image are different images (i.e., not copies of each other).

In one embodiment, resolution function 268 of manipulation module 206 provides control to adjust the resolution of each respective first image and second image to facilitate matching the resolution of a substitute portion of a second image 110 relative to the resolution of a target portion of a first image 102. Accordingly, by using the resolution function 268, a manipulated first image will include a generally consistent resolution despite incorporating a substituted portion from a second image having a different resolution than the original first image.

In one embodiment, image quality function 269 of manipulation module 206 provides control over various qualities of the image, such as the contrast, saturation, tone, white balance, etc., on display screen 22 (FIG. 1) to enable the operator to either match these qualities between the substituted portion and the image into which it is received or to match these qualities between the entire first and second images. This matching is implemented either before or after a manipulation of the first image and the second image. In another embodiment, this same image quality function 268 is implemented to intentionally mismatch these qualities (e.g., contrast, saturation, tone, white balance, etc.) between the substitute portion and the image into which it is received or to mismatch these qualities between the entire first image and the second image. Accordingly, with this feature, the operator is provided further artistic license via user interface 20 of the camera to perform creative manipulations of images directly at the camera 10.

In one embodiment, controller 280 of editing monitor 200 may be implemented in hardware, software, firmware, or any combination thereof. The implementation may be via a microprocessor, programmable logic device, or state machine. Additionally, components of the editing monitor 200 may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

FIG. 4A is a plan view of a grid selector function 300 of a display screen of a camera, according to one embodiment of the invention. In one embodiment, grid selection function 300 operates in association with grid function 216 of selection module 202 of editing monitor 200 (previously described in association with FIG. 3) to identify a portion of an image to be manipulated via a swap function or other editing function.

As illustrated in FIG. 4A, display screen 302 of camera 10 corresponds to either one of two sides of display screen 22 in FIG. 1. In one aspect, display screen 302 includes a grid 304 defining an array of grid portions 306 and a selected grid portion 310. In use, grid selection function 300 is activated for manipulating an image viewable in display screen 302, causing grid 304 to be overlaid onto the image. A target portion of the image is identified for manipulation via highlighting and selecting a grid portion 310 (from the array 304 of grid portions 306) that corresponds to the target portion of the image.

In one embodiment, pixel parameter 217 of the grid function 216 (FIG. 3) is activated so that each grid portion 306 of grid array 304 (FIG. 4A) corresponds to each pixel of the window (first window 24 or second window 26) of display screen 22 (FIG. 1) and the operator then selects multiple grid portions 306 to identify the grid portion 310 as the target portion of the image (in the first window 24 or second window 26 as viewed on the display screen 22). In this arrangement, the resolution for selecting grid portions 306 is limited by the resolution of the display screen, such as 320×240. In one embodiment, the pixels are selected via touch screen 25 (FIG. 1) in which a stylus (e.g., stylus parameter 212 of selection module 202) handled by the operator is used to contact the pixels to be selected.

In another embodiment, pixel parameter 217 of the grid function 216 (FIG. 3) is activated so that each grid portion 306 of grid array 304 corresponds to each pixel of the image (stored in memory 50 or in live mode) and the operator selects multiple grid portions 306 to identify the grid portion 310 that designates the target portion of the image in the first window 24 or the second window 26. However, because the resolution of the image (e.g., 2048×1536) is substantially greater than the resolution of the display (e.g. 320×240), a zoom function (e.g., zoom function 140 in FIG. 2B, resize function 266 in FIG. 3) is activated to magnify the area of interest on the image (as viewed via display screen 22) to enable the user to select grid portions 306 as pixels at the resolution of the actual image. Because user interface 20 includes a dual scrolling feature via independent first and second windows (24, 26), each image in the respective separate windows is independently magnifiable to facilitate the selection and manipulation of the respective images.

This arrangement provides precision marking of the target portion of the first image when the lower resolution of the display screen would otherwise hinder identifying fine features of the first image as the target portion, as well as providing precision identification or marking of the substitute portion of the second image when the lower resolution of the display screen would otherwise hinder identifying fine features of the second image as the substitute portion. Accordingly, these arrangements insure that once the manipulated image is printed in its normal resolution, as opposed to the screen resolution available via user interface 20 of camera 10, the proper manipulation or substitution will have taken place. As in the prior arrangement, a stylus is used to select (via touch screen 25 of display screen 22) the pixels that identify the target portion and/or substitute portion. In addition, in another embodiment, resolution function 268 of manipulation module 206 of editing monitor 200 in FIG. 3 is used, in association with grid function 216 as illustrated in FIG. 4A, to substantially match the resolution of the respective first and second images during pixel identification and/or after pixel identification.

FIG. 4B is a plan view of a spot selection function 325 of a display screen of a camera, according to one embodiment of the invention. In one embodiment, spot selection function 300 operates in association with spot function 218 of selection module 202 of editing monitor 200 (previously described in association with FIG. 3) to identify a portion of an image to be manipulated via a swap function or other editing function. As illustrated in FIG. 4B, display screen 327 corresponds to either one of two sides of display screen 22 of camera 10 shown in FIG. 1. In one embodiment, spot selection function 325 comprises a spot 330 that is movable about display screen 327 to highlight a target portion of an image on display screen 327 to be manipulated.

In one aspect, spot selection function 325 comprises a pan function 332 to move the spot 330 about display screen 327 to the target portion to be highlighted. Once the spot 330 is in the proper location, a manipulation function such as swap function 260 of editing monitor 200 (FIG. 3) is activated. In another aspect, spot selection function 325 comprises a zoom function 334 to enlarge or shrink, respectively, the spot 330 to resize the spot 330 to insure that the identified target portion corresponds to the size of the portion of the image to be manipulated.

Figure 4C:
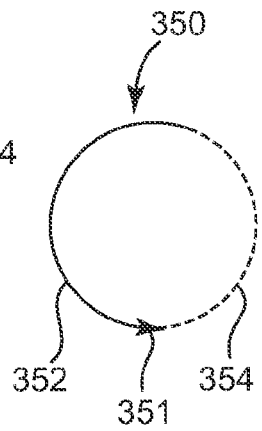
FIG. 4C is a schematic illustration of a cursor selector in a method of editing an image, according to an embodiment of the invention.

FIG. 4C illustrates operation of a cursor function 350, according to one embodiment of the invention. In one embodiment, cursor function 350 operates in association with cursor function 214 of selection module 202 of editing monitor 200 (previously described in association with FIG. 3) to identify a portion of an image to be manipulated via a swap function or other editing function. As illustrated in FIG. 4C, cursor function 350 enables an operator to drive or move a cursor 351 to form a line 352 and thereby trace a pattern 354 corresponding to the size and shape of target portion of an image to be manipulated. Pattern 354 is formed in any shape of pattern, such as rectangular, irregular, triangular, star-shaped, etc. corresponding to the shape of the intended target portion of the image to be manipulated.

Figure 5A:
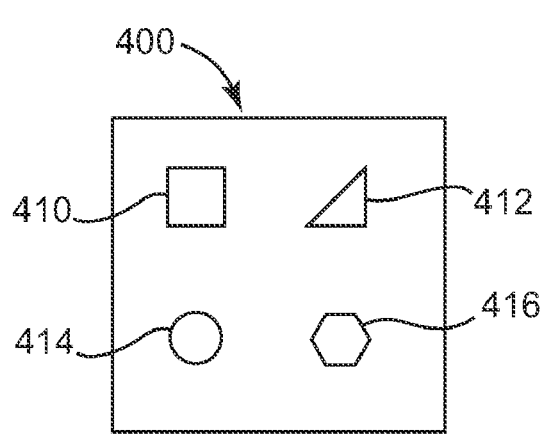
FIG. 5A is a schematic illustration of a geometric pattern selector in a method of editing an image, according to an embodiment of the invention.

FIG. 5A illustrates a geometric identifier function 400, according to one embodiment of the invention. In one embodiment, geometric identifier function 350 operates in association with geometric array function 234 of selection module 202 of editing monitor 200 (previously described in association with FIG. 3) to identify a portion of an image to be manipulated via a swap function or other editing function. As illustrated in FIG. 5A, geometric identifier function 400 comprises an array of geometric patterns 410, 412, 414, 416 that are used to find a target portion of an image having a shape and/or size corresponding to one of the geometric patterns 410-416. In one aspect, the array comprises a rectangular pattern 410, a triangular pattern 412, a circular pattern 414, and a polygon pattern 416 (e.g., a pentagon, hexagon, octagon, etc.), as well as other definable geometric shapes. A size of each geometric pattern 410-416 on the display screen is controllable via a zoom function, such as zoom function 140, 334 previously described in association with FIGS. 2B and 4B, respectively. In another aspect, a position of each geometric pattern 410-416 on the display screen is controllable via a pan function, such as pan function 142, 332, as previously described in association with FIGS. 2B and 4B, respectively.

Figure 5B:
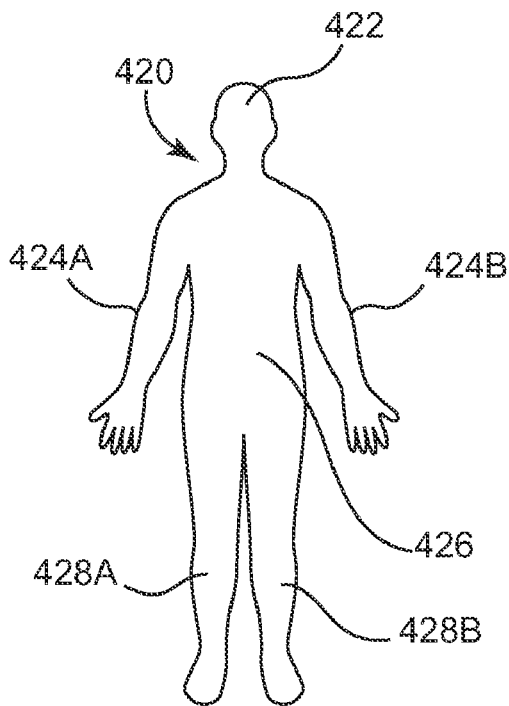
FIG. 5B is a schematic illustration of a body part selector in a method of editing an image, according to an embodiment of the invention.

FIG. 5B is a plan view of a body part function 420, according to one embodiment of the invention. In one embodiment, body part function 400 operates in association with body part function 232 of selection module 202 of editing monitor 200 (previously described in association with FIG. 3) to identify a portion of an image to be manipulated via a swap function or other editing function.

As illustrated in FIG. 5B, body part function 420 is used to identify a target portion of an image for manipulation where the image corresponds to a human body. Accordingly, body part function 420 comprises a pattern of a human body including a head portion 422, arms 424A, 424B, torso 426, and legs 428A, 428B. The entire pattern, or one of the individual portions 424A-428B, is resizable or positionable about a display screen via a zoom function (e.g., zoom function 140, 334 in FIGS. 2B, 4B) or pan function (e.g., pan function 142, 332 in FIGS. 2B, 4B). The body part function 400 simplifies the task of identifying target portions of an image (to be manipulated) that correspond to a human body. Moreover, body part function 400 is configurable to identify any human body part, such as hair, toes, fingers, back, elbow, knee, etc. and is not expressly limited to the body parts specifically identified by reference numerals in FIG. 5B.

Figure 6:
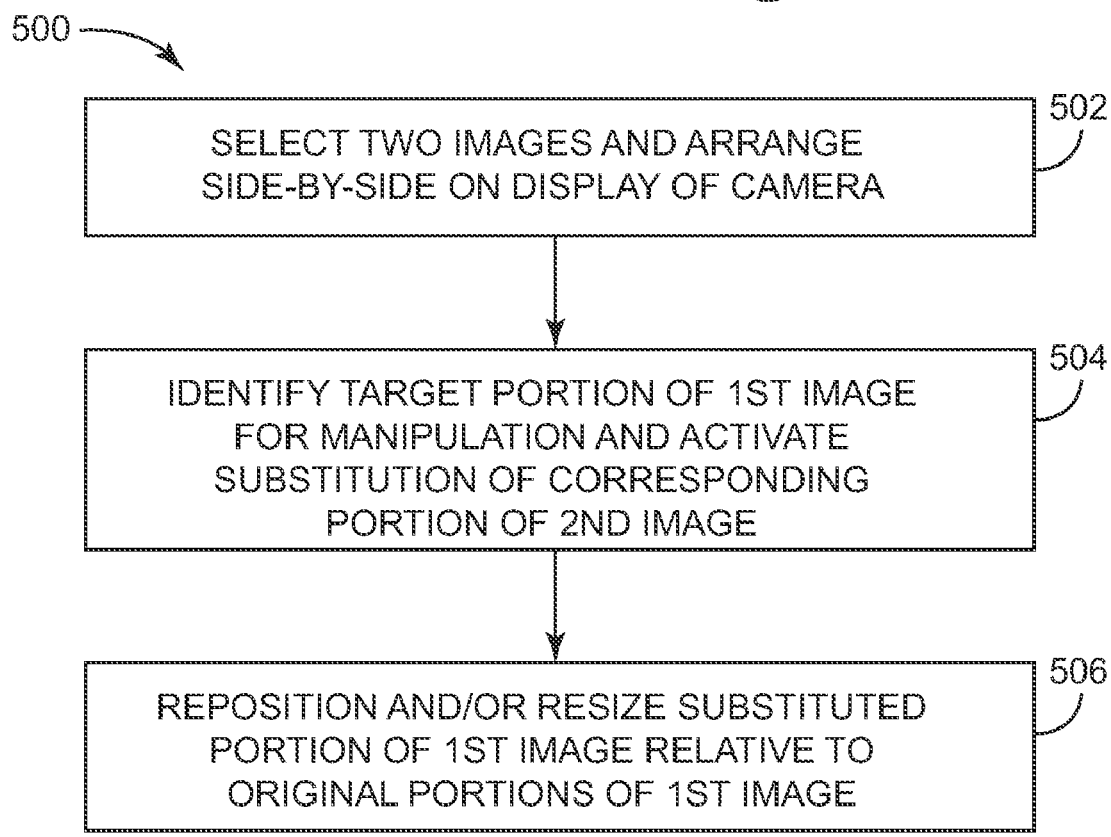
FIG. 6 is a flow diagram of a method of editing an image on a display of a camera, according to an embodiment of the invention.

FIG. 6 is a flow diagram of a method 500 of manipulating an image, according to one embodiment of the invention. In one embodiment, method 500 is performed using one or more of the embodiments described in association with FIGS. 1-5B. In another embodiment, method 500 is performed using other devices and systems. As illustrated in FIG. 6, at 502 method 500 comprises selecting two images and arranging the two images side-by-side on a display screen of a camera. At 504, a target portion of a first image of the two images is identified for manipulation and then the method includes activating substitution of a portion of the second image that generally corresponds in size, shape, or type relative to the target portion of the first image. At 506, the substituted portion of the first image is repositioned and/or resized relative to the original portions of the first image.

Embodiments of the invention ease manipulation of images by providing a mechanism to perform the manipulation between two different images directly at the display of the camera.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A camera user interface comprising:
    a display screen including a first portion configured to display a first image of a first plurality of images and a second portion configured to display a second image of a second plurality of images, wherein the display screen simultaneously displays the first image and the second image;
    a scroller function configured to control scrolling through the first plurality of images on the first portion independently relative to scrolling through the second plurality of images on the second portion of the display screen; and
    an image manipulator module including:
        a selection function configured to enable user identification of a first portion of the first image; and
        a swap function configured to automatically recognize a second portion of the second image that generally corresponds to the first portion of the first image and configured to automatically substitute the second portion of the second image for the first portion of the first image to produce a modified first image on the first portion of the display screen with the modified first image including the second portion as a substitute first portion.

2. The camera user interface of claim 1 wherein the image manipulator module includes at least one of:
    a pan function configured to move the first portion of the first image the substitute first portion of the modified first image, or the second portion of the second image in at least one of an up direction, down direction, a left direction, or right direction on the display screen relative to a remaining portion of the first image, the modified first image, or second image, respectively; and
    a zoom function configured to enlarge or reduce the size of the first portion of the first image, the substitute first portion of the modified first image, or the second portion of the second image relative to the remaining portion of the first image, the modified first image, or the second image, respectively.

3. The camera user interface of claim 1 wherein the image manipulator module includes:
    a geometric shape selector cooperable with the selection function and the swap function, the geometric shape selector configured to enable user identification of the first portion of the first image, via user selection of a geometric shape from an array of geometric shapes to cause automatic selection of the first portion based on a substantial match between the user-selected respective geometric shape and the first portion of the first image, wherein the array of geometric shapes comprises at least one of a generally circular shape, a generally triangular shape, a generally rectangular shape, or a generally polygonal shape.

4. The camera user interface of claim 1 wherein the image manipulator module comprises:
    a body portion selector cooperable with the selection function, the body portion configured to enable user identification of the first portion of the first image via user manipulation of a human body pattern on the first portion of the display screen relative to the first image to cause a substantial match between at least one body portion of the human body pattern relative to a corresponding body portion of a person in the first image.

5. The camera user interface of claim 4, wherein the human body pattern comprises a plurality of body portions including at least one of a leg portion, a torso portion, an arm portion, or a head portion.

6. The camera user interface of claim 5, wherein the image manipulation module comprises an auto-recognition function configured to automatically match the respective body portions of the human body pattern relative to the corresponding body portions of the person of the first image.

7. The camera user interface of claim 1 wherein the image manipulator module comprises a grid selector cooperable with the selection function and configured to overlay a grid array onto the first image on the first portion to enable user identification of the first portion of the first image to be replaced based on selection of one or more portions of the grid array.

8. The camera user interface of claim 7 wherein the grid selector of the image manipulator module comprises a pixel parameter configured to cause each respective grid of the grid array to correspond to at least one of a pixel of the image or a pixel of the display screen.

9. The camera user interface of claim 1 wherein the display screen comprises a touch screen in communication with the image manipulator module and configured to permit user selection, via the selection function, of the first portion of the first image via the user contacting a region of the touch screen corresponding to the first portion of the first image on the first portion of the display screen.

10. The camera user interface of claim 9 and further comprising a stylus configured for contacting the region of the touch screen to select the first portion of the first image.

11. The camera user interface of claim 1 wherein the selection function of the image manipulator module comprises a cursor controllably navigable, via a control button, to identify the first portion of the first image to be substituted with the second portion of the second image.

12. The camera user interface of claim 1 and further comprising a camera including:
   a body with the camera user interface mounted on the body of the camera;
   a lens mounted to the body; and
   a memory configured to store a plurality of images, including the first image,
   wherein the second image is a live image captured via the lens of the camera.

13. The camera user interface of claim 1 wherein the first portion of the display screen is arranged in a side-by-side relationship relative to the second portion of the display screen.

14. The camera user interface of claim 1 wherein the image manipulator module comprises a color function configured to assign at least one of the first image or the second image as at least one of a color image or a black-and-white image, respectively.

15. The camera user interface of claim 1 wherein the image manipulator comprises a highlight function configured to visually identify at least one of the first portion of the first image and the second portion of the second image.

16. The camera user interface of claim 1 wherein the first image and the second image are substantially the same image.

17. A method of editing an image with a camera, the method comprising:
   simultaneously displaying a first image and a second image separate from each other on a display screen of the camera;
   upon receiving a user identification of a target portion of the first image via a user interface the camera, automatically substituting a second portion of the second image for the target portion of the first image to produce a modified first image, wherein the second portion substantially matches the target portion according to at least one of a user-selectable, predefined geometric shape or a user-selectable, predefined body portion of a human body pattern; and
   providing at least one of a pan function and a zoom function to move or resize, respectively, the substituted portion of the modified first image on the display screen relative to a remaining portion of the modified first image.

18. The method of claim 17 wherein the display screen comprises a first portion and a second portion and wherein simultaneously displaying a first image and a second image comprises:
   selecting at least one of the first image and the second image from a plurality of images stored within a memory of the camera via scrolling through the plurality of images on the first portion and the second portion of the display screen, wherein scrolling on the first portion of the display screen is controllable independently from scrolling on the second portion of the display screen.

19. The method of claim 17 wherein the first image comprises a first person and the second image comprises a second person, and wherein the target portion and the second portion each comprise a head of a person.

20. The method of claim 19 wherein the first image is the substantially the same as the second image except for the first image being at least one of a black-and-white image or a color image and the second image being at least one of a black-and-white image or a color image.

21. The method of claim 17 comprising at least one of:
   providing the display screen as a touch screen of the user interface and receiving the user identification of the target portion via contact upon a region of the touch screen corresponding to the target portion of the first image; or
   providing the user interface with a cursor viewable on the display screen and receiving the user identification of the target portion via a selectable position of the cursor on the display screen over the target portion.

22. A camera comprising:
   means for simultaneously displaying a first image of a plurality of images and a second image of the plurality of images, different from the first image; and
   means for manipulating the first image via enabling user selection of a first portion of the first image to trigger automatic replacement of the first portion with a corresponding second portion of the second image to produce a modified first image including a substitute first portion defined by the second portion of the second image.

23. The camera of claim 22 wherein the means for simultaneously displaying comprises:
   means for scrolling through the plurality of images on the first display screen and for scrolling through the plurality of images on the second display screen to select the first image for viewing on a first portion of a first display screen and to select the second image for viewing on a second portion of second display screen.

24. The camera of claim 22 and further comprising:
   means for capturing the second image as a generally continuous live image of the second person; and
   means for storing a plurality of images including the first image of the first person.

25. The camera of claim 24 wherein the means for capturing comprises a lens of the camera.

* * * * *

UNITED STATES PATENT AND TRADEMARK OFFICE
CERTIFICATE OF CORRECTION

PATENT NO. : 7,697,054 B2
APPLICATION NO. : 11/693171
DATED : April 13, 2010
INVENTOR(S) : Robb P. Cazier et al.

It is certified that error appears in the above-identified patent and that said Letters Patent is hereby corrected as shown below:

In column 12, line 13, in Claim 2, delete "image" and insert -- image, --, therefor.

In column 12, line 30, in Claim 3, delete "image," and insert -- image --, therefor.

Signed and Sealed this
Seventeenth Day of April, 2012

David J. Kappos
*Director of the United States Patent and Trademark Office*